United States Patent [19]
Totten et al.

[11] Patent Number: 5,273,580
[45] Date of Patent: Dec. 28, 1993

[54] HIGH TEMPERATURE WELL CEMENT COMPOSITIONS AND METHODS

[75] Inventors: Patty L. Totten, Duncan; Donald W. Lindsey, Marlow; Bobby J. King, Duncan, all of Okla.

[73] Assignee: Halluburton Company, Duncan, Okla.

[21] Appl. No.: 973,442

[22] Filed: Nov. 9, 1992

Related U.S. Application Data

[62] Division of Ser. No. 767,299, Sep. 27, 1991, Pat. No. 5,184,680.

[51] Int. Cl.$^5$ ............................................. C04B 24/10
[52] U.S. Cl. ................................... 106/724; 106/730; 106/725; 106/804; 405/266; 405/267
[58] Field of Search ............... 106/724, 730, 725, 804, 106/805, 809; 166/292, 293, 308; 405/266, 267

[56] References Cited

U.S. PATENT DOCUMENTS

| | | | |
|---|---|---|---|
| 3,794,115 | 2/1974 | Skagersberg | 166/292 |
| 4,777,360 | 10/1984 | Almond | 106/308 |
| 4,997,487 | 3/1991 | Vinson et al. | 106/730 |

Primary Examiner—Mark L. Bell
Assistant Examiner—Paul Marcantoni
Attorney, Agent, or Firm—Thomas R. Weaver; C. Clark Dougherty, Jr.

[57] ABSTRACT

Improved set retarded cement compositions and methods of using such compositions which are substantially non-thinning at high temperatures and which can include fresh or salt water are provided. The compositions are comprised of hydraulic cement, sufficient water to form a pumpable slurry, a set retarder and a delayed viscosifying agent which yields viscosity at high temperatures comprised of a treated depolymerized galactomannan gum.

15 Claims, No Drawings

HIGH TEMPERATURE WELL CEMENT COMPOSITIONS AND METHODS

CROSS-REFERENCE TO RELATED APPLICATION

This is a division of application Ser. No. 07/767,299 filed Sep. 27, 1991, now at U.S. Pat. No. 5,184,680, issued Feb. 9, 1993.

BACKGROUND OF THE INVENTION

1. Field of the Invention

The present invention relates generally to high temperature well cement compositions and methods, and more particularly, to set retarded cement compositions which are substantially non-thinning at high temperatures and methods of using such compositions.

2. Description of the Prior Art

In the primary cementing of oil, gas and geothermal wells, casing and/or one or more liners are cemented within the well bore. The cementing is accomplished by introducing a cement composition into the annular space between the casing and/or liner and the walls of the well bore. Generally, the cement composition is pumped downwardly within the casing and/or liner to the bottom thereof and then upwardly into the annulus. Once placed in the annulus, the cement composition sets into a hard mass whereby the casing and/or liner is bonded to the earth formations forming the walls of the well bore.

Because one or more of the formations or zones penetrated by the well bore may contain fluids under pressure, the cement composition density is often increased by including a weighting material such as hematite therein to increase the hydrostatic pressure exerted by the composition on the formations. One or more set retarding additives are also usually included in the cement composition in order to allow adequate time for mixing the composition on the surface and then pumping it down the well bore and into a desired location therein. While set retarding additives successfully extend the time between mixing and the setting of cement compositions, they are also temperature sensitive. That is, the higher the temperature to which a cement composition including such an additive is subjected, the greater quantity of the additive required. In high temperature wells wherein the cement composition must contain relatively high quantities of a set retarding additive, excessive thinning of the cement composition often occurs which leads to the settling of solids such as weighting materials in the cement composition as well as the separation of free water therefrom which can bring about undesirable results such as the formation of a non-uniform density cement column, bridging, water pockets within the set cement column, poor bonding, etc.

The high temperature thinning of set retarded cement compositions has been reduced heretofore by combining one or more viscosifying agents with the cement compositions. However, the quantities of viscosifying agents which can be utilized in cement compositions are limited because the viscosifying agents impart high surface viscosities to the cement compositions which in turn makes mixing and pumping difficult. Thus, even where one or more viscosifying agents are included in a cement composition, because of the limited amounts of such agents which can be used excessive thinning at high temperatures still results.

More recently, the thinning of a set retarded cement composition a high temperatures has been combated by including a delayed viscosifying agent in the composition which yields viscosity only at the high temperatures encountered. U.S. Pat. No. 4,997,487 issued on Mar. 5, 1991 discloses such a delayed viscosifying agent comprised of a galactomannan gum which has been treated with a hydrophobing agent. While the delayed viscosifying agent functions to make set retarded cement compositions formed with fresh water non-thinning at high temperatures, the agent is relatively ineffective in saturated salt water cement compositions. Saturated salt water cement compositions are used to cement across subterranean salt and anhydrite sections which would be partially dissolved if fresh water cement compositions were used. Also, in cementing formations which include highly sensitive swellable clays saturated salt water cement compositions are preferred in that such clays are less sensitive to saturated salt water than to fresh water. Saturated salt water cement compositions are generally also more compatible with oil based muds than fresh water compositions.

Thus, there is a need for improved set retarded cement compositions and methods of using such compositions where the compositions can be formed using any normally available water including saturated salt water.

SUMMARY OF THE INVENTION

Improved set retarded cement compositions which are substantially non-thinning at high temperatures and methods of using such compositions for cementing wells which overcome the shortcomings of the prior art and meet the above described need are provided. The compositions are basically comprised of hydraulic cement, sufficient water to form a pumpable slurry, a set retarder and a delayed viscosifying agent which yields viscosity at high temperatures comprised of a complexing agent treated depolymerized galactomannan gum. That is, the delayed viscosifying agent is a galactomannan gum which has been depolymerized by reaction with an oxidizing agent and treated with a complexing agent whereby the hydration rate of the depolymerized gum is retarded at temperatures below about 120° F. to 140° F. and at pH levels above about 10. When the temperature increases to a level above from about 120° F. to 140° F. and higher, the rate of hydration of the treated depolymerized gum also increases thereby offsetting the thinning of the cement composition due to high temperature. The non-thinning set retarded cement compositions of this invention can be formed using fresh water, oil field brines, seawater and other saturated or unsaturated salt waters.

In order to increase the viscosity produced by the delayed viscosifying agent and thereby further reduce the settling of solids and other adverse results brought about by the thinning of cement compositions at high temperatures, a crosslinking agent can be included in the compositions. The crosslinking agent functions to crosslink the delayed viscosifying agent as it hydrates.

It is, therefore, an object of the present invention to provide improved set retarded cement compositions which can include fresh or salt containing water and which are substantially non-thinning at high temperatures.

Other and further objects, features and advantages of the present invention will be readily apparent to those skilled in the art upon a reading of the description of preferred embodiments which follows.

DESCRIPTION OF PREFERRED EMBODIMENTS

The cement compositions of the present invention are pumpable set retarded hydraulic cement compositions formed with fresh water, oil field brines, seawater or other saturated or unsaturated salt water and containing delayed viscosifying agents which make the compositions substantially non-thinning at high temperatures. When the compositions are placed in deep hot subterranean zones to be cemented by way of well bores penetrating the zones, the compositions rapidly develop high gel strengths followed by rapid compressive strength development. The substantial non-thinning of the cement compositions prevents excessive settling of solids, separation of free water after placement and the adverse cementing results produced by such conditions.

To obtain desired cementing results in oil, gas, geothermal and water well applications, a variety of additives are often included in cement compositions to vary their densities, increase or decrease compressive strengths upon setting, accelerate or retard thickening times, control filtrate losses, increase resistance to corrosive fluids, etc. Generally, such compositions are formed by mixing hydraulic cements with water and other additives to provide properties appropriate for the conditions existing in the individual wells to be cemented.

In accordance with the present invention, set retarded well cement compositions formed with any of the fresh or salt containing waters normally available are provided for cementing high temperature wells. The cement compositions develop high gel strengths in relatively short time periods after placement followed by rapid compressive strength development, and the compositions are substantially non-thinning at the high temperatures encountered. The term "high temperature(s)" is used herein to mean temperatures in the range of from about 120° F. to about 500° F.

The cement compositions of the present invention are comprised of hydraulic cement, sufficient water to form a pumpable slurry, one or more set retarders, and a delayed viscosifying agent which yields viscosity at high temperatures comprised of a complexing agent treated depolymerized galactomannan gum. Other conventional additives such as silica flour, weighting materials, dispersing agents, fluid loss additives, and the like can also be included in the cement compositions.

Various hydraulic cements can be utilized for forming the cement compositions of the present invention. Portland Cement is preferred and can be, for example, one or more of the various Portland Cements identified as API Classes A through H and J Cements. These cements are identified and defined in the *Specification for Materials and Testing for Well Cements,* API Specification 10, of the American Petroleum Institute which is incorporated herein by reference. Premium cements which do not meet the exact specifications for the above mentioned API Classes G and H are also suitable for use in accordance with this invention. Of the various hydraulic cements which can be utilized, API Classes G and H and premium cements are preferred.

The water used for forming the compositions can be fresh water or a salt containing water such as oil field brine, seawater or other saturated or unsaturated salt water. The water is generally included in the cement composition in an amount of from about 30% to about 60% by weight of the dry hydraulic cement utilized. However, as will be understood, the particular quantity of water utilized can vary appreciably from the aforesaid amounts.

The delayed viscosifying agent which yields viscosity at high temperatures and which can be utilized in saturated salt water cement compositions as well as in fresh water cement compositions is a complexing agent treated depolymerized galactomannan gum. Galactomannan gums which are useful in accordance with the present invention are those naturally occurring polysaccharides which are primarily composed of D-mannose and D-galactose units. The gums are soluble in water and form thick, highly viscous solutions, i.e., the gums hydrate in water. Galactomannan gums are derived from various endosperms of seeds, and examples are carob, tara, locust bean, guar, paloverde, honey locust, and the like. The preferred galactomannan gum for use in accordance with the present invention is guar gum.

In order to make the galactomannan gum operable in saturated salt water and in accordance with the present invention, the galactomannan gum utilized is treated with a complexing agent to delay hydration and depolymerized to reduce the viscosity of the hydrated gum. The depolymerization is accomplished by reacting the galactomannan gum with an oxidizing agent such as hydrogen peroxide, potassium permanganate or other commonly used oxidizing agent, or by irradiating the gum with ultraviolet light. The galactomannan gum is depolymerized by the cleaving of ether linkages contained therein and, as mentioned, the depolymerization causes the hydrated viscosity of the gum to be lowered to a level which makes the gum functional in cement compositions, particularly in saturated salt water cement compositions. A 1.0% (by weight of water) aqueous solution of non-depolymerized guar gum has a viscosity measured on a Fann Model 35 Viscometer of 80 to 100 cp at 300 rpm. This is compared with the depolymerized guar gum useful in accordance with this invention which has a viscosity of 5 to 20 cp at 300 rpm. The preferred method of depolymerizing the galactomannan gum utilized is to react the gum with hydrogen peroxide.

The galactomannan gum is also treated with a complexing agent, either before or after depolymerization, which causes the natural hydrophillic properties of the gum to be inhibited whereby the gum can be dispersed in an aqueous carrier liquid having a temperature below about 120° F. to 140° F. and a pH of about 10 or greater without substantially increasing the viscosity of the carrier liquid. That is, the hydration rate of a dispersed complexing agent treated depolymerized galactomannan gum is substantially retarded in an aqueous hydraulic cement composition until the temperature of the composition increases to above about 120° F. to 140° F.

The complexing agent can be any material capable of temporarily inhibiting the natural hydrophillic property of a galactomannan gum. Examples of such complexing agents which can be utilized to treat galactomannan gums and substantially retard the hydration rates thereof at temperatures below about 120° F.–140° F. and at pH levels above about 10 are potassium pyroantimonate and compounds capable of liberating borate ions when added to water. Suitable borate liberating compounds are boric acid, alkyl metal borates, sodium tetraborate (borax), sodium perborate and sodium metaborate. Preferred complexing agents are those which liberate borate ions, and the most preferred complexing agent is boric acid.

The degree of retardation i.e., the slowness of the hydration rate of the complexing agent treated depolymerized galactomannan gum depends on the extent of the complexing agent treatment. The treatment is carried out by reacting the gum in an aqueous solution containing the complexing agent used. When a borate ion liberating complexing agent is utilized, a sufficient amount is reacted with the galactomannan gum to achieve a gum containing boron in an amount in the range of from about 100 parts to about 4000 parts per million by weight of gum, preferably from about 500 ppm to about 2000 ppm.

The resulting complexing agent treated depolymerized galactomannan gum is effective as a delayed viscosifying agent which yields viscosity at high temperatures in salt water cement compositions as well as in cement compositions formed using fresh water and unsaturated salt water.

In order to enhance the high temperature non-thinning properties of the cement compositions of this invention such as when high quantities of weighting agents are utilized, a crosslinking agent can optionally be included therein. The crosslinking agent used can be any inorganic or organic multivalent metal compound capable of crosslinking the delayed viscosifying agent, i.e., the complexing agent treated depolymerized galactomannan gum used when the gum hydrates at high temperatures to thereby further increase the viscosity of the cement composition without adversely affecting the other properties of the cement composition. Examples of particularly suitable crosslinking agents are organic titanates and organic zirconates which function as described above. A preferred such crosslinking agent is a heat reacted mixture of zirconium triethanolamine, glycerol and water of the type described in U.S. Pat. No. 4,477,360 issued Oct. 16, 1984. A 1:1:1 by weight mixture of zirconium triethanolamine, glycerol and water heated to a temperature in the range of from about 140° F. to about 160° F. is the most preferred. When used, the crosslinking agent is generally included in a cement composition in an amount in the range of from about 5% to about 15% by weight of delayed viscosifying agent used, most preferably about 9% by weight of delayed viscosifying agent.

A set retarded cement composition of this invention which is substantially non-thinning at high temperatures is comprised of hydraulic cement, preferably API Class H or G Portland Cement, sufficient fresh or salt water to form a pumpable slurry, a set retarder and a delayed viscosifying agent which yields viscosity at high temperatures comprised of a complexing agent treated depolymerized galactomannan gum. The galactomannan gum is depolymerized by reaction with an oxidizing agent or U.V. light and is treated with a complexing agent whereby the hydration rate of the depolymerized gum is retarded at temperatures below about 120° F.-140° F. and at pH levels above about 10, but the hydration rate increases at temperatures above about 120° F.-140° F. The treated depolymerized gum is present in the cement composition in an amount sufficient to offset the thinning of the cement composition at temperatures above about 120° F.-140° F. by the hydration of the gum. As indicated above, the cement composition can optionally include a crosslinking agent for the delayed viscosifying agent.

The galactomannan gum is preferably guar gum depolymerized with hydrogen peroxide and treated with a complexing agent selected from the group consisting of compounds capable of liberating borate ions in water, preferably boric acid. Such a treated depolymerized guar gum is preferably present in the set retarded cement composition in an amount in the range of from about 0.05% to about 2% by weight of dry hydraulic cement in the composition.

A particularly preferred cement composition includes a borate treated depolymerized gum present in the composition in an amount in the range of from about 0.2% to about 1.25% by weight of dry hydraulic cement in the composition. When used, a crosslinking agent comprised of a 1:1:1 by weight heat reacted mixture of zirconium triethanolamine, glycerol and water is preferably included in the cement composition in an amount in the range of from about 5% to about 15% by weight of delayed viscosifying agent therein, preferably 9% by weight.

While various set retarders can be utilized in the cement compositions of this invention, a preferred set retarder which allows rapid development of cement compressive strength after placement is comprised of a copolymer of 2-acrylamido, 2-methylpropane sulfonic acid (referred to herein as AMPS ®, a registered trademark of the Lubrizol Corp.) and acrylic acid. The copolymer comprises from about 40 to about 60 mole percent AMPS ® with the balance comprising acrylic acid. Preferably, the copolymer comprises from about 45 to about 55 mole percent AMPS ®, and most preferably, about 50 mole percent AMPS ®. The set retarding copolymer is preferably present in a cement composition of this invention in an amount in the range of from about 0.1% to about 5% by weight of hydraulic cement, most preferably from about 0.5% to about 2% by weight of hydraulic cement.

In order to enhance the set retarding ability of the AMPS ®—acrylic acid copolymer at high temperatures, the cement compositions also preferably include tartaric acid or a salt thereof, preferably sodium tartrate, in an amount in the range of from about 0.1% to about 3% by weight of hydraulic cement most preferably about 0.25% to about 2% by weight of hydraulic cement.

When conventional retarders, e.g., lignosulfonates in conjunction with retarder intensifiers such as borates or organic acids, e.g., gluconic acid, citric acid and the like are used in lieu of the preferred AMPS ®—acrylic acid copolymer described above, they are preferably used in amounts ranging as follows: lignosulfonates—0.1% to 5% by weight of cement; and retarder intensifier—0.2% to 5% by weight of cement. If tartaric acid or salts thereof are used with lignosulfonate set retarders, the acid or salts are preferably present in amounts in the range of from about 0.2% to about 5% by weight of cement used.

The set retarded cement compositions of the present invention also preferably include at least one fluid loss reducing additive. While a variety of fluid loss reducing additives can be utilized to insure low fluid loss, a liquid fluid loss reducing complex comprised of an aqueous solution of the reaction product of polyethyleneimine having a molecular weight above about 50,000 and a sulfonated organic compound is preferred. The sulfonated organic compound is selected from the group consisting of lignosulfonic acid salts having sodium, calcium or ammonium as the associated cation, naphthalene sulfonic acid condensed with formaldehyde having a molecular weight above about 5000, and mixtures of such compounds. The above described fluid loss reducing additive is described in detail in U.S. Pat. No. 4,742,094 issued May 3, 1988 and is referred to heeinafter as "an aqueous solution of the reaction product of polyethyleneimine and one or more sulfonated organic compounds". When used in a composition of the present invention, the liquid fluid loss reducing additive is preferably present therein in an amount in the range of from about 2.5% to about 10% by weight of dry hydraulic cement in the composition, most preferably about 5% by weight of hydraulic cement.

A particularly preferred set retarded cement composition of the present invention which is substantially non-thinning at high temperatures is comprised of hydraulic cement, preferably API Class H or G Portland Cement; sufficient water (either fresh or salt water) to form a pumpable slurry; a set retarder comprised of a copolymer of AMPS® and acrylic acid having an average molecular weight below about 5000 and comprising from about 40 to about 60 mole percent AMPS® present in an amount in the range of from about 0.2% to about 3% by weight of hydraulic cement in said composition, and tartaric acid present in an amount in the range of from about 0.1% to about 1.5% by weight of hydraulic cement; a fluid loss additive comprised of an aqueous solution of the reaction product of polyethyleneimine and one or more sulfonated organic compounds present in said composition in an amount in the range of from about 2.5% to about 10% by weight of hydraulic cement in the composition; and a delayed viscosifying agent which yields viscosity at temperatures above about 120° F.-140° F. at pH levels above about 10 comprised of guar gum which has been depolymerized by reaction with hydrogen peroxide whereby a 1% by weight aqueous solution thereof has a viscosity of 5 to 20 cp measured using a Fann Model 35 Viscometer at 300 rpm and treated with a borate compound whereby the viscosifying agent contains boron in an amount in the range of from about 500 ppm to about 2000 ppm, the delayed viscosifying agent being present in the composition in an amount in the range of from about 0.05% to about 2% by weight of hydraulic cement, most preferably in an amount of from about 0.2% to about 1.25by weight of hydraulic cement. The composition also preferably includes a crystalline silica to prevent strength retrogression in an amount in the range of from about 10% to about 50% by weight of hydraulic cement used, and a crosslinking agent comprised of a 1:1:1 by weight heat reacted mixture of zirconium triethanolamine, glycerol and water in an amount of from about 5% to about 15% by weight of delayed viscosifying agent, preferably about 9% by weight of delayed viscosifying agent.

In carrying out the method of the present invention, a high temperature set retarded well cement composition of the present invention is prepared by admixing the hydraulic cement, water, set retarder, fluid loss additive and any other additives utilized followed by the complexing agent treated depolymerized galactomannan gum utilized and crosslinking agent, if used. The resulting set retarded cement composition is then pumped into a well bore or conduit disposed therein to a subterranean zone wherein the cement composition is to be placed. Upon the discontinuance of pumping, the composition rapidly develops static gel strength during the transition phase from a slurry to a hard mass followed by uniform development of compressive strength. In addition, when the temperature of the cement composition is increased to above about 120° F.-140° F. during placement and after being placed, the hydration rate of the complexing agent treated depolymerized galactomannan gum increases which in turn increases the viscosity of the composition thereby offsetting the high temperature thinning of the composition which would otherwise take place and preventing the settling of solids, the formation of free water, etc.

In order to facilitate a clear understanding of and to further illustrate the high temperature set retarded well cement compositions and methods of this invention, the following examples are provided. The test results presented in the examples as well as the components and procedures utilized are intended to be illustrative of the invention and not limiting thereto.

EXAMPLE I

Test cement compositions were prepared in a Waring blender. The dry components used were dry blended first and the liquid components were premixed with the water used and placed in the blender. The preblended dry components were then introduced into the blender and the components were mixed on high speed for 35 seconds.

The cement compositions were tested for suspension properties at 210° F. and at 375° F. using a High Temperature—High Pressure (HTHP) consistometer in accordance with the following solids settling test procedure.

The solids settling test results are qualitative "pass or fail" rather than quantitative. The procedure is used to characterize solids segregation under simulated high temperature downhole well conditions. A cement slurry is prepared according with procedures outlined in API Specification 10; *Specification for Materials and Testing for Well Cements*. The initial cement slurry viscosity (Bc-Bearden units of consistency) is noted and the slurry is heated to the test temperature (BHCT-bottomhole circulating temperature) and pressure in an HTHP consistometer using a well simulation thickening time testing schedule.

Upon reaching the test temperature and pressure, the slurry viscosity (Bc) is recorded and the slurry cup drive motor is turned off for 10 minutes. At the completion of the 10 minutes static period, the drive motor is turned back on and the maximum viscosity (Bc) is recorded at the instant movement is started. If the paddle drive shear pin breaks, the test is terminated. After cooling to 194° F., the slurry is examined.

In the event the shear pin remains intact, the cement slurry is stirred 50 minutes. At the end of the 50 minute period, the viscosity (Bc) is recorded and the 10 minute static period is repeated. The test procedure includes three 10 minute static intervals alternating with two 50 minute stirring periods. At the conclusion of the last 10 minute static period after the maximum viscosity (Bc) is recorded, the consistometer motor drive and heater units are turned off and the cement slurry is quickly cooled to 194° F.

Upon reaching 194° F., the slurry cup containing the cement slurry is removed from the consistometer. The slurry cup is kept upright and the cement slurry examined and a description recorded. A cement composition failure is one which exhibits major solids settling, wide differences in deflection viscosity at the end of the static periods, or one in which the shear pin for the paddle drive shears or breaks.

The cement compositions which were prepared and tested are as follows:

| Component | Control Cement Composition 1 | Cement Composition A | Cement Composition B | Control Cement Composition 2 | Cement Composition C | Cement Composition D |
|---|---|---|---|---|---|---|
| Premium Cement[1] | — | — | — | — | — | — |
| 200 Mesh Silica Flour | 35% | 35% | 35% | 40% | 40% | 40% |
| Hematite Weighting Mtl. | 21.3% | 21.3% | 21.3% | 38.7% | 38.7% | 37.8% |
| Defoamer | 0.25% | 0.25% | 0.25% | — | — | — |
| Set Retarder[2] | 0.1% | 0.1% | 0.1% | 1.0% | 1.0% | 1.0% |
| Set Retarder Intensifier[3] | — | — | — | 0.5% | 0.5% | 0.5% |
| Fluid Loss Control Additive[4] | 14% | 14% | 14% | 9.3% | 9.3% | 9.3% |
| Sodium Chloride | 37.1% | 37.1% | 37.1% | 26.7% | 26.7% | 26.7% |
| Water | 38.8% | 38.8% | 38.8% | 49.6% | 49.6% | 49.6% |
| Delayed Viscosifying Agent No. 1[5] | None | 0.5% | None | None | 0.5% | None |
| Delayed Viscosifying Agent No. 2[6] | None | None | 0.5% | None | None | 0.5% |

[1]All percentages are based on the weight of dry cement present except for sodium chloride which are based on the weight of water.
[2]AMPS® - acrylic acid copolymer.
[3]Tartaric acid.
[4]Aqueous solution of the reaction product of polyethyleneimine and one or more sulfonated organic compounds.
[5]Hydroxypropylguar (HPG) treated with 800 ppm boron.
[6]Depolymerized guar gum treated with 600 ppm boron.

The results of the tests are set forth in Tables 1 and 2 below.

TABLE 1

| Cement Composition | Initial Viscosity ($B_c$) | 210° F. Deflection Viscosity 1st | 2nd | 3rd | Settling Description | Pass/ Fail |
|---|---|---|---|---|---|---|
| Control 1 | 28 | 8/138 | 6/142 | 6/140 | Major | Fail |
| A | 32 | 8/102 | 10/140 | 9/144 | Major | Fail |
| B | 26 | 14/14 | 10/11 | 9/10 | Slight | Pass |

TABLE 2

| Cement Composition | Initial Viscosity ($B_c$) | 375° F. Deflection Viscosity 1st | 2nd | 3rd | Settling Description | Pass/ Fail |
|---|---|---|---|---|---|---|
| Control 2 | 12 | 2/78 | sheared pin | | Major | Fail |
| C | 16 | 2/112 | sheared pin | | Major | Fail |
| C (Repeat) | 13 | 4/102 | sheared pin | | Major | Fail |
| D | 12 | 2/14 | 2/44 | 2/56 | Slight | Pass |
| D (Repeat) | 12 | 2/24 | 2/26 | 2/52 | Slight | Pass |

From Tables 1 and 2 above, it can be seen that the improved cement compositions of the present invention (compositions B and D) were substantially non-thinning at high temperatures.

EXAMPLE II

The procedures of Example I were repeated except that some of the cement compositions prepared and tested included crosslinking agents and the tests were conducted at 375° F. only. The components and the quantities thereof in the tested compositions were as follows:

| Component | Control Cement Composition 3 | Cement Composition E | Cement Composition F | Cement Composition G | Cement Composition H | Cement Composition I | Cement Composition J |
|---|---|---|---|---|---|---|---|
| Premium Cement[1] | — | — | — | — | — | — | — |
| 200 Mesh Silica Flour | 40% | 40% | 40% | 40% | 40% | 40% | 40% |
| Hematite Weighting Mtl. | 38.7% | 38.7% | 38.7% | 38.7% | 38.7% | 38.7% | 38.7% |
| Dispersant[2] | 0.5% | 0.5% | 0.5% | 0.5% | 0.5% | 0.5% | 0.5% |
| Set Retarder[3] | 1.0% | 1.0% | 1.0% | 1.0% | 1.0% | 1.0% | 1.0% |
| Set Retarder Intensifier[4] | 0.5% | 0.5% | 0.5% | 0.5% | 0.5% | 0.5% | 0.5% |
| Fluid Loss Control | 0.6% | 0.6% | 0.6% | 0.6% | 0.6% | 0.6% | 0.6% |

-continued

| Component | Control Cement Composition 3 | Cement Composition E | Cement Composition F | Cement Composition G | Cement Composition H | Cement Composition I | Cement Composition J |
|---|---|---|---|---|---|---|---|
| Additive[5] | | | | | | | |
| Sodium Chloride | 30.6% | 30.6% | 30.6% | 30.6% | 30.6% | 30.6% | 30.6% |
| Water | 49.6% | 49.6% | 49.6% | 49.6% | 49.6% | 49.6% | 49.6% |
| Delayed Viscosifying Agent No. 3[6] | None | 0.75% | None | None | None | None | None |
| Delayed Viscosifying Agent No. 4[7] | None | None | 1.25% | 1.25% | None | None | None |
| Delayed Viscosifying Agent No. 5[8] | None | None | None | None | 1.0% | 1.0% | None |
| Delayed Viscosifying Agent No. 6[9] | None | None | None | None | None | None | 1.25% |
| Crosslinking Agent[10] | None | None | None | 9.0% | None | 9.0% | 9.0% |

[1] All percentages based on the weight of dry cement present except those for sodium chloride which are based on the weight of water and those for the Crosslinking Agent which are based on the weight of delayed viscosifying agent present.
[2] Sulfonated acetone formaldehyde condensate (See U.S. Pat. No. 4,557,763 issued December 10, 1985).
[3] AMPS ® - acrylic acid copolymer.
[4] Tartaric acid.
[5] Grafted lignite polymer (See U.S. Pat. No. 4,676,317 issued June 30, 1987).
[6] Hydroxypropylguar (HPG) treated with 800 ppm boron.
[7] Depolymerized guar gum treated with 651 ppm boron.
[8] Depolymerized guar gum treated with 627 ppm boron.
[9] Depolymerized guar gum treated with 710 ppm boron.
[10] 1:1:1 by weight mixture of zirconium triethanolamine, glycerol and water heated to 140°-160° F.

The results of the tests are as set forth in Table 3 below.

TABLE 3

| Cement Composition | Initial Viscosity (Bc) | 375° F. Deflection Viscosity | | | Settling Description | Pass/Fail |
|---|---|---|---|---|---|---|
| | | 1st | 2nd | 3rd | | |
| Control 3 | 16 | 4/48 | sheared pin | | Major | Fail |
| E | 42 | 16/96 | sheared pin | | Major | Fail |
| F | 38 | 8/10 | 8/14 | 8/68 | Some | Pass |
| G | 34 | 15/15 | 10/10 | 10/14 | Slight | Pass |
| H | 38 | 12/12 | 6/10 | 6/52 | Some | Pass |
| I | 38 | 20/20 | 10/10 | 10/43 | Slight | Pass |
| J | 52 | 20/20 | 8/8 | 7/10 | None | Pass |

From Table 3, it can be seen that the inclusion of crosslinking agents in the cement compositions of this invention (cement compositions G, I and J) enhanced the non-thinning characteristics of the compositions by increasing the viscosities thereof.

Thus, the present invention is well adapted to carry out the objects and attain the ends and advantages mentioned as well as those which are inherent therein. While numerous changes in the invention may be made by those skilled in the art, such changes are encompassed within the spirit of the invention as defined by the appended claims.

What is claimed is:

1. In a set retarded cement composition which is substantially non-thinning at high temperatures comprised of hydraulic cement, sufficient water to form a pumpable slurry, a set retarder and a delayed viscosifying agent which yields viscosity at high temperatures comprised of a treated galactomannan gum, the improvement wherein the delayed viscosifying agent is a galactomannan gum which has been depolymerized and treated with a complexing agent whereby the hydration rate of said depolymerized gum is retarded at temperatures below about 120° F. to 140° F. and at pH levels above about 10 but the hydration rate increases at temperatures above about 120° F. to 140° F., said treated depolymerized galactomannan gum being present in said composition in an amount sufficient to offset the thinning of said composition at temperatures above about 120° F. to 140° F. by the hydration of said gum.

2. The composition of claim 1 which is further characterized to include a crosslinking agent for said delayed viscosifying agent.

3. The composition of claim 1 wherein said galactomannan gum is selected from the group consisting of carob, tara, locust bean, guar, paloverde, and honey locust gums.

4. The composition of claim 1 wherein said galactomannan gum is depolymerized by reaction with an oxidizing agent.

5. The composition of claim 1 wherein said complexing agent is selected from the group consisting of potassium pyroantimonate and compounds capable of liberating borate ions when added to water.

6. The composition of claim 5 wherein said treated depolymerized galactomannan gum is present in said composition in an amount in the range of from about 0.05% to about 2% by weight of hydraulic cement in said composition.

7. The composition of claim 2 wherein said crosslinking agent is present in said composition in an amount in the range of from about 5% to about 15% by weight of treated depolymerized galactomannan gum therein.

8. The composition of claim 1 wherein said treated depolymerized galactomannan gum is depolymerized guar gum treated with a borate ion liberating complexing agent whereby said gum contains from about 100 parts to about 4000 parts per million boron by weight of gum, said treated depolymerized guar gum being present in said composition in an amount in the range of from about 0.05% to about 2.0% by weight of hydraulic cement in said composition.

9. The composition of claim 8 which is further characterized to include a crosslinking agent comprised of a 1:1:1 by weight heat reacted mixture of zirconium triethanolamine, glycerol and water, said crosslinking agent being present in said composition in an amount in the range of from about 5% to about 15% by weight of said gum.

10. The composition of claim 1 wherein said set retarder is comprised of a copolymer of 2-acrylamido, 2-methyl-propane sulfonic acid and acrylic acid having an average molecular weight below about 5000 and comprising from about 40 to about 60 mole percent of a copolymer of 2-acrylamido, 2-methyl-propane sulfonic acid, said set retarder being present in said composition in an amount in the range of from about 0.1% to about 5% by weight of hydraulic cement in said composition.

11. The composition of claim 7 wherein said set retarder is further characterized to include tartaric acid or a salt thereof present in an amount in the range of from about 0.1% to about 5% by weight of hydraulic cement in said composition.

12. The composition of claim 1 which is further characterized to include at least one fluid loss additive therein.

13. The composition of claim 12 wherein said fluid loss additive is an aqueous solution of the reaction product of polyethyleneimine and one or more sulfonated organic compounds present in said composition in an amount in the range of from about 2.5% to about 10% by weight of hydraulic cement in said composition.

14. The composition of claim 1 wherein said set retarder is comprised of a copolymer of 2-acrylamido, 2-methyl-propane sulfonic acid and acrylic acid having an average molecular weight below about 5000 and comprising from about 40 to about 60 mole percent of a copolymer of 2-acrylamido, 2-methyl-propane sulfonic acrylic acid present in an amount in the range of from about 0.5% to about 2% by weight of hydraulic cement in said composition and tartaric acid present in an amount in the range of from about 0.25% to about 2% by weight of hydraulic cement in said composition; and said treated depolymerized galactomannan gum is borate treated guar gum present in an amount in the range of from about 0.2% to about 1.25% by weight of hydraulic cement in said composition.

15. The composition of claim 14 which is further characterized to include a fluid loss additive comprised of an aqueous solution of the reaction product of polyethyleneimine and one or more sulfonated organic compounds present in said composition in an amount in the range of from about 2.5% to about 10% by weight of hydraulic cement in said composition.

* * * * *